Sept. 17, 1957  R. S. McDONALD  2,806,957
APPARATUS AND METHOD FOR SPECTRAL ANALYSIS
Filed Oct. 22, 1954
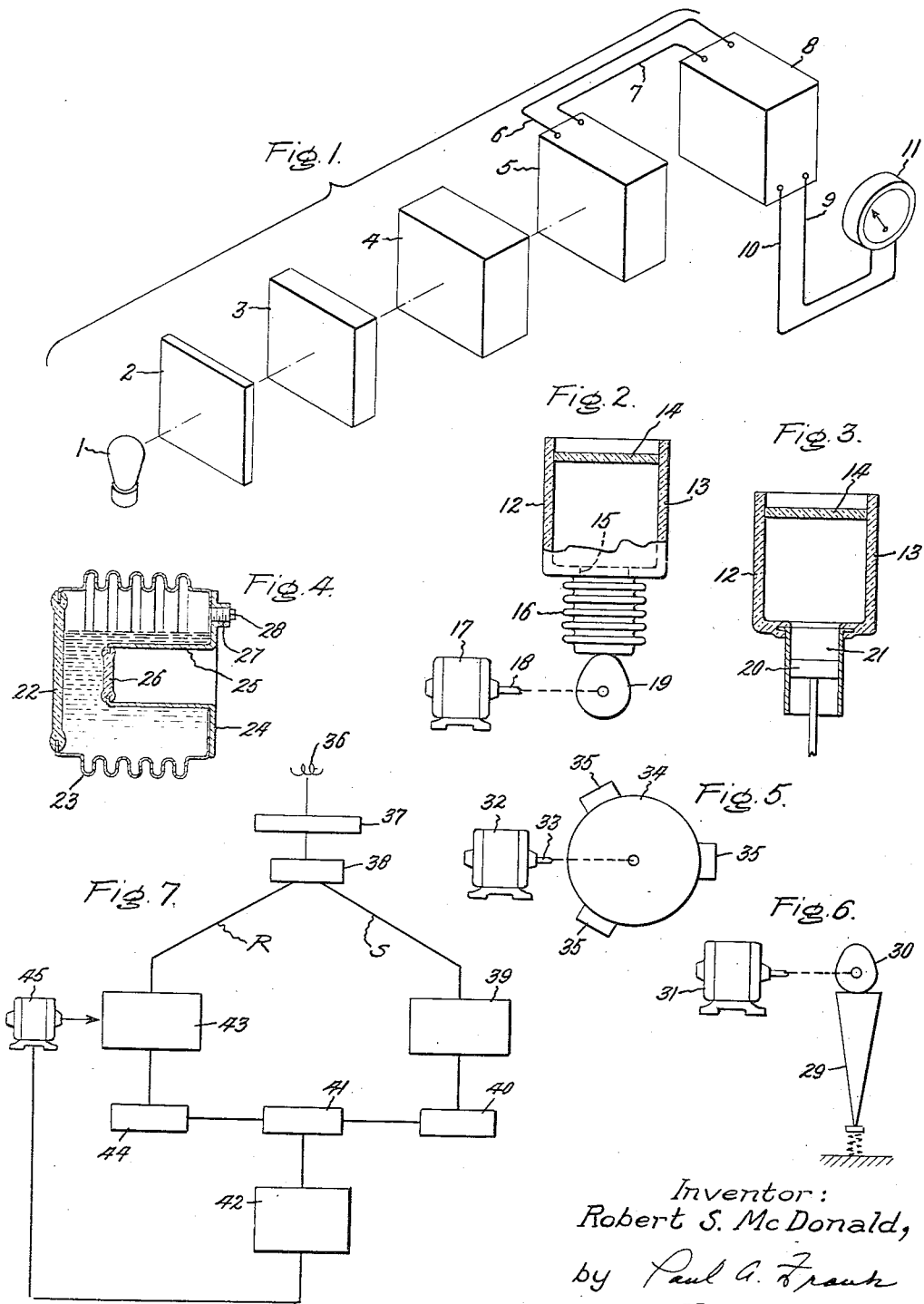
Inventor:
Robert S. McDonald,
by Paul A. Frank
His Attorney.

United States Patent Office 2,806,957
Patented Sept. 17, 1957

2,806,957

APPARATUS AND METHOD FOR SPECTRAL ANALYSIS

Robert S. McDonald, Ballston Lake, N. Y., assignor to General Electric Company, a corporation of New York Application October 22, 1954, Serial No. 463,933

10 Claims. (Cl. 250—43.5)

This invention relates to methods and apparatus for quantitatively detecting the presence of particular components within a heterogeneous mixture of gases, liquids or solids. More particularly, the invention relates to methods and apparatus for quantitatively detecting the presence of particular constituents of matter by methods of analysis based upon the selective absorption of electromagnetic radiation by such materials.

It is a well known fact that when electromagnetic radiation possessing a relatively wide spectral distribution is passed through a liquid, solid or gaseous medium, the medium will selectively absorb particular wavelength regions of the radiation, the wavelengths absorbed being characteristic of the absorbing medium. When such radiation has passed through an absorbing medium, the transmitted spectrum may be detected by a suitable detecting device and the spectrum analyzed to determine the constituents present in the absorbing medium.

When the method of spectral analysis is utilized to quantitatively detect the presence of a particular constituent of matter in a given sample it is desirable to pass electromagnetic radiation, having a band including the region of the electromagnetic spectrum characteristically absorbed by that material, through the sample and to measure the attenuation of the characteristic wavelengths by absorption within the sample. This method requires the use of filters which remove from the beam passed through the sample all but the desired region of the electromagnetic spectrum. It is, however, often difficult to obtain filters to selectively pass only the desired wavelengths. Additionally, in some regions of the electromagnetic spectrum, as for instance the infra-red region, the characteristic absorption regions of materials commonly analyzed are quite narrow, and it is quite difficult to obtain suitable narrow region filters.

The above difficulties have been partially overcome by what is referred to in the art as the "negative filter" type analyzer. One such device is described in U. S. Patent No. 1,758,088 to H. Schmick. Devices of this type use a double beam of radiation and compare the attenuation caused by absorption in the two beams to determine the amount of the material sought to be quantitatively detected which is present in the sample being tested. According to this method each beam of electromagnetic radiation, both of which are from a common source and, hence, have the same spectral distribution, passes through a separate filter chamber and through a portion of the sample being tested. The filter chamber interposed in the first path is filled with a pure sample of the material the presence of which is sought to be quantitatively detected in the sample. The filter chamber interposed within the second path is maintained empty or contains some non-absorbing material. The terminal intensity of each beam is detected by an appropriate measuring device, as for instance a bolometer, and signals representative of the two intensities are balanced against each other by a suitable device, as for instance a Wheatstone bridge. Since the filter interposed in the first path removes from that beam all components of the electromagnetic spectrum characteristically absorbed by the material sought to be detected, the intensity of the first beam is affected by the absorption, within the sample to be tested, of all wavelengths in the emitted spectrum not characteristic of the material sought to be quantitatively detected. The intensity of the first beam is not affected by the absorption, within the sample to be tested, of all wavelengths in the emitted spectrum characteristic of the material sought to be quantitatively detected. The intensity of the second beam, on the other hand, is affected by the absorption, within the sample tested, of all wavelengths in the emitted spectrum including the wavelengths characteristic of the material sought to be quantitatively detected. When these two signals are balanced against each other the components representative of the wavelengths not characteristic of the material sought to be quantitatively detected in each beam should ideally cancel out and the resultant signal should be representative of the attenuation caused by absorption of wavelengths characteristic of the material sought to be quantitatively detected, from which the amount of that material present within the sample tested may be determined.

The above-described method of double beam negative filter spectral analysis is, however, far less ideal than is desired, and a number of disadvantages of this method render it not completely satisfactory with respect to accuracy, calibration, and sensitivity determination.

One of the greatest disadvantages of the double beam negative type method of spectral analysis is its susceptibility to error. Readings taken are representative of a small difference between two large signals. Because of this, a small percentage error in one large signal causes an extremely large error in the final reading. As an example of this error susceptibility of double beam negative type spectral analyzers, a small amount of dirt or foreign substance upon the surface of one of the transparent surfaces will give a greater signal than the quantity being measured. Thus, the operation of such devices must be conducted with the utmost care if any reliable results are to be obtained. Additionally, the calibration, and hence the determination of the sensitivity of this type spectral analyzer is a tedious procedure and is difficult to perform. For the above reasons, and others, the double beam negative filter type method of spectral analysis is inaccurate, difficult to perform, and, in general, not completely satisfactory.

It is therefore an object of the invention to provide improved methods and apparatus for performing absorption spectral analysis.

Another object of the invention is to provide simpler, more accurate methods and apparatus for absorption type spectral analysis than heretofore available methods and apparatus.

A further object of the invention is to provide methods and apparatus for absorption type spectral analysis in which the absorption of radiant energy by a sample tested may be measured directly.

Yet another object of the invention is to provide accurate, easily-operated spectral analysis apparatus which directly measures the absorption of electromagnetic radiation by a test sample.

The novel features believed characteristic of the invention are set forth in the appended claims. The invention itself, however, together with further objects and advantages thereof may best be understood by reference to the following description taken in connection with the acccompanying drawings, in which:

Fig. 1 is a diagrammatic illustration of a preferred embodiment of my invention;

Figs. 2, 3, 4, 5 and 6 are sectional views of modulators constructed in accordance with the teachings of my invention; and Fig. 7 is a block diagram of a further embodiment of the invention.

Referring to Fig. 1 there is illustrated a diagram of a spectral analyzer of the absorption type wherein a source of radiation 1 is provided. Source 1 is illustrated schematically as an incandescent lamp, but it will be understood that any of the many sources known in the art may be used for this purpose. For example, if an X-ray analysis is being made, a source of X-radiation is employed, whereas if an infra-red analysis is being made, a source of infra-red radiation is employed. The radiation from source 1 preferably passes through a lens or collimator 2 and thence through a modulating filter 3. In filter 3 that portion of the emission spectrum from source 1 which corresponds in wavelength to the characteristic absorption region of the material to be quantitatively detected is intensity modulated at a selected frequency. While the frequency of modulation may be chosen at any value, as for instance in the sonic range, I find it convenient to modulate at a relatively low frequency, preferably in the vicinity of 10 cycles per second. The other components of the wave are not appreciably affected in the filter such that the radiation passed through modulating filter 3 contains a steady state component, and an alternating component. Those wavelengths of the original radiation which are unaffected by modulating filter 3 retain their original steady state characteristics, whereas those wavelengths which are affected by filter 3 contain an alternating component. This composite wave is then passed through a sample chamber 4 in which is located a sample unknown to be analyzed. If the sample within chamber 4 contains the constituent the presence of which is sought to be quantitatively detected, the modulated component of the composite beam is attenuated. The degree of attenuation is, among other things, dependent upon the quantity of the material in chamber 4. Since these other characteristics may be controlled, the attenuation may be measured and is indicative of the quantity of the particular material contained within the sample.

The radiation thus passing from chamber 4 contains an attenuated steady state component and an attenuated alternating component. The composite radiation is directed on a detector 5 which produces a voltage output having a magnitude dependent upon the intensity of the radiation supplied thereto. The voltage thus generated by detector 5 has two components, a steady state component and an alternating component. This voltage is coupled by means of electrical conductors 6 and 7 to an A.-C. amplifier 8, synchronized to the frequency of modulation, wherein the alternating or modulated component is separated from the steady state component. This alternating voltage is then amplified and coupled through a pair of conductors 9 and 10 to an alternating current measuring instrument 11, where the magnitude is utilized as an indication of the amount of the constituent sought to be quantitatively detected that is present within the unknown sample.

Since the modulating filter serves the purpose of causing the intensity of the components of the electromagnetic radiation which are characteristically absorbed by the constituent sought to be analyzed to vary cyclically, thus facilitating their separation from the remainder of the spectrum, it will be appreciated that this purpose may be served equally well by locating modulating filter along the optical path after the unknown chamber, as well as before it, as hereinbefore described.

To check the calibration of the instrument, sample chamber 4 is exhausted of any constituent material which absorbs the modulated component of the radiation passed by filter 3. Consequently, the current in meter 11 and consequently the reading thereof, is a maximum. Therefore, since the attenuation of the modulated component of the radiation is dependent upon the type and quantity of that constituent contained in chamber 4, the reduction in the reading of meter 11 when the chamber is filled with the sample is indicative of the presence as well as the quantity of the particular material to be detected.

The above-described, readily performed calibration check, which prepares the apparatus of this invention for use is to be contrasted to the difficult manner in which the double beam spectral analysis apparatus of the prior art are calibrated. Calibration of the prior art apparatus requires first that the sample chamber be exhausted of all materials which absorb radiant energy at the wavelengths characteristically absorbed by the constituent sought to be quantitatively detected. The two beams are then balanced against each other. The sensitivity (and hence the calibration) of the apparatus to the constituent sought to be detected is then determined by introducing a composition having an accurately determined amount of that constituent into the sample chamber and noting the reading of the apparatus. This process is susceptible to many errors and is difficult to perform as compared to the calibration determination of the apparatus of the invention.

In Fig. 2 there is shown a device constructed in accordance wtih another aspect of my invention which may be utilized to modulate the energy radiated from source 1. This device finds particular application when the material to be detected is in the gaseous state. The device comprises a closed chamber having a pair of oppositely disposed walls 12 and 13 which are made of a material transparent to the wavelength radiation used. For example, for infra-red and ultra-violet spectral analysis, walls 12 and 13 may be calcium fluoride. Cylindrical member 14 having the ends thereof respectively sealed to walls 12 and 13 completes the enclosure. An aperture 15 is provided in member 14 and has located thereacross a bellows 16. A pure sample of the constituent material to be detected is provided within the enclosure. While no means is shown for inserting or removing the sample from the enclosure, many such means will become apparent to those skilled in the art. A motor 17 having a rotatable shaft 18 mechanically linked to a cam 19, is provided to cyclically compress the sample contained in the chamber. When it is desired to modulate the radiant energy at a very low rate, a gear box may be employed between shaft 18 and cam 19. As the pressure of the gas within the chamber is increased, the quantity of the constituent material to be detected which is located in the path of the radiation beam is increased thereby increasing the amount of attenuation of the characteristic wavelengths, and consequently decreasing the intensity of the beam leaving the chamber. Consequently, the attenuation of the component of the radiant energy corresponding to the material to be detected is cyclically varied in time at a rate corresponding to the cyclic variation of the gas pressure.

In Fig. 3 there is illustrated another embodiment of a radiation modulator wherein a piston and associated cylinder are utilized to vary the pressure of the gas sample. In this embodiment a piston 20 is provided within a cylinder 21 which extends outwardly from the wall of the chamber. Piston 20 may be driven by some suitable means such, for example, as the cam and motor arrangement of Fig. 2.

In Fig. 4 there is illustrated a radiation modulator which is especially useful in the modulation of characteristic wavelengths of fluid samples, either liquid or gaseous. In this embodiment, member 22, transparent to the radiation emitted by the source used, has connected thereto a cylindrical bellows 23. At the other end of bellows 23 is provided a planar annular member 24 having a depending centrally located cylindrical portion 25 at the inner end of which is provided a member 26, which is transparent to the radiation emitted by the source used.

Consequently, transparent members 22 and 26 are oppositely located. Annular member 24 is provided with a threaded aperture 27 in which is located a mating threaded plug 28. In operation, the fluid sample is inserted within the enclosure through opening 27 and the distance between members 22 and 26 is periodically varied, as by means of a cam operating on the upper surface of member 24. In this way, the path length through the sample is cyclically varied such that the quantity of the sample within the radiation path and, consequently, the degree of attenuation of the desired wavelength is cyclically varied. When the sample is in the solid, rather than in the fluid state, the length of the material within the radiation path may be adjusted by the device of Fig. 6 in which a tapered prism 29 is cyclically reciprocated transverse the beam axis by means of eccentric cam 30 driven by a power source 31. The optical path length through prism 29 is thus cyclically varied and the degree of modulation varies at a controllable frequency.

In the embodiment of Fig. 5 there is illustrated a device which may be utilized to modulate the radiant wave with the aid of samples in the liquid, solid or gaseous state. In this embodiment, a motor 32 having a rotatable shaft 33 is mechanically coupled to a rotatable disc 34. Disc 34 has provided at a plurality of positions along the periphery thereof chambers 35 in which are provided pure samples of the material to be detected. These samples may take the form of a gas, a liquid, or a solid, depending upon the material to be detected. In this arrangement, disc 34 is located such that during each cycle of revolution thereof the pure samples each interrupt the radiant beam once. Consequently, the speed of rotation of the disc and the number of samples provided on the periphery thereof is determinative of the frequency at which the radiant energy is modulated. The wave passing from this modulator thus has one component which is intensity pulse-modulated.

The hereinbefore described method of spectral analysis utilizing a modulated filter containing a sample of the constituent matter which is sought to be quantitatively detected may be used to construct a spectral analyzer utilizing only a single ray of elecromagnetic radiation as illustrated in Fig. 1. Additionally, due to the fact that this invention contemplates the introduction of a modulated component of transmitted radiation, the intensity of which is indicative of the quantity of the constituent material to be analyzed in the unknown sample, the teachings of this invention may be further applied to the spectral analyzers of the prior art in order to provide improved methods of spectral analysis. Thus, the inherent disadvantage of the prior art double beam spectral analyzers, due to the fact that the measured signal is a small difference between two large signals, may be overcome by virtue of the teachings of this invention by which the steady state component of the received signal is eliminated, and the alternating component measured directly, giving a direct indication of the concentration of the constituent, the presence of which is to be quantitatively detected.

In Fig. 7 of the drawing there is shown, a diagrammatically, a spectral analyzer of the double beam type in which the teachings of the present invention are applied to produce a more accurate device.

The double beam spectral analyzer of Fig. 7 comprises a source of electromagnetic radiation 36 which emits radiation in a selected region of the electromagnetic spectrum, as for instance, the infra-red, the ultra-violet, or the X-ray region. Electromagnetic radiation within a selected region emanating from source 36, either focused or unfocused, is directed through modulating filter 37 described hereinbefore with respect to the embodiment of Fig. 1. Filter 37 cyclically varies the intensity of the wavelength characteristically absorbed by the material sought to be quantitatively detected, as is hereinbefore described. The modulated beam which now contains a steady state component not characteristic of the material sought to be quantitatively detected and an alternating component which is characteristic of the material which is sought to be quantitatively detected, is directed to a beam dividing device 38, which may be an optical instrument including prisms or half-silvered mirrors. Beam dividing device 38 divides the incident beam into two beams of the same intensity possessing the same spectral distribution. These two beams, for clarity's sake, may be referred to as the sample beam, S, and the reference beam, R. The sample beam passes through a sample holder 39 containing a sample of the unknown which is to be analyzed for the presence of a particular component, and after passing therethrough, falls upon detecting device 40, which may conveniently be a bolometer, a thermocouple, or a lead sulfide cell capable of detecting incident radiation. Detecting device 40 produces an electrical signal representative of the intensity of the radiation falling upon it. This electrical signal passes to amplifier 41 where the alternating component is separated from the steady state component by rectification and is further amplified. The output of amplifier 41 is then fed into balancing device 42 which may comprise a Wheatstone bridge or other similar device.

The reference beam, after being separated from the original beam in beam dividing device 38, passes through a variable beam intensity attenuator 43, which may conveniently be an iris diaphragm with a variable diameter aperture which limits the diameter of the beam and hence the intensity of the transmitted light. After passing through beam attenuator 43, the reference beam falls upon detector 44, which is similar to detector 40 in the path of the sample beam. Detector 44 produces an electrical signal representative of the intensity of the radiation in the reference beam. This electrical signal passes to amplifier 41 where the alternating component is separated from the steady state component and amplified. The rectified and amplified electrical signal is then fed into balancing device 42 where it is balanced against the amplified signal from the sample beam. Should the output of detector 44 be lesser or greater than the output of detector 40, the difference signal is passed to reversible motor 45 which controls the adjustment of beam attenuator 43 in the reference beam path. Reversible motor 45 moves in the proper direction to increase or decrease the intensity of the reference beam until the signal received by detector 44 is equal to that received by detector 40 and the same amount of radiation of the chosen wavelengths is passed by either beam. The position of beam attenuator 43 and hence motor 45 may be calibrated directly to read the quantity of the material sought to be quantitatively detected which is present in the unknown in sample holder 39.

While the invention has been described by a particular embodiment thereof, it will be understood that those skilled in the art may make many changes and modifications without departing from the true spirit and scope of the invention. Therefore, by the appended claims, I intend to cover all such changes and modifications.

What I claim as new and desire to secure by Letters Patent of the United States is:

1. Apparatus for quantitatively detecting the presence of a particular material in a mixture of matter comprising, a source of electromagnetic radiation selected from the group consisting of infra-red radiation, ultraviolet radiation and X-radiation including a plurality of wavelengths, means for selectively intensity modulating all of the wavelengths of said radiation which are characteristically absorbed by the material sought to be quantitatively detected, means for passing said radiation through a sample mixture of matter to be tested, whereby the modulated selected wavelengths of said radiation characteristically absorbed by the material sought to be quantitatively detected are attenuated in proportion to the amount of said material present in said mixture, means for converting the modulated and attenuated radiation into an electrical signal, and means for separating the modulated components of said signal from the remainder thereof.

2. Apparatus for quantitatively detecting the presence of a particular material in a mixture of matter, comprising a source of electromagnetic radiation selected from the group consisting of infra-red radiation, ultra-violet radiation and X-radiation including a plurality of wavelengths, means for selectively intensity modulating all of the wavelengths of said radiation characteristically absorbed by the material sought to be quantitatively detected, said means comprising a cyclically variable concentration of the material, the presence of which is sought to be quantitatively detected, disposed in the path of said radiation, means for passing said modulated radiation through a sample of said mixture of matter to be tested, whereby the selected wavelengths of said radiation characteristically absorbed by the material sought to be quantitatively detected are attenuated in proportion to the amount of said material present in said mixture, means for converting the modulated and attenuated radiation into an electrical signal, means for separating the modulated component of said signal from the remainder thereof, and means for determining the amplitude of said modulated components.

3. In an apparatus for quantitatively detecting the presence of a particular material in a mixture of matter, said apparatus including a source of electromagnetic radiation selected from the group consisting of infra-red radiation, ultra-violet radiation and X-radiation comprising a plurality of wavelengths, means for passing said radiation through a sample of the material to be analyzed, and means for detecting said radiation and converting said radiation into an electrical signal, the improvements which comprise means interposed between said source of radiation and said detecting means for selectively intensity modulating all of the selected wavelengths of said radiation characteristically absorbed by the material sought to be quantitatively detected, and means electrically connected to the output of said detecting means for separating the modulated components of said electrical signal from the remainder thereof.

4. The improvements of claim 3 wherein the modulating means comprises a chamber including a gaseous sample of the material to be quantitatively detected and means for cyclically varying the pressure of said sample.

5. The improvement of claim 3 wherein the modulating means comprises a chamber containing a fluid sample of the material sought to be quantitatively detected and means for cyclically varying the optical path length through said fluid.

6. The improvement of claim 3 wherein the modulating means comprises a solid sample of the material which is sought to be quantitatively detected and means for moving said sample so as to cause the optical path length through said sample to vary cyclically.

7. The method of quantitatively detecting the presence of a particular material in a mixture of matter which comprises selectively modulating all of the wavelength components of a beam of electromagnetic radiation selected from the group consisting of infra-red radiation, ultra-violet radiation and X-radiation characteristically absorbed by the material the presence of which is sought to be quantitatively detected, passing said selectively modulated beam of electromagnetic radiation through a sample of said mixture of matter to be analyzed, converting the electromagnetic radiation into an electrical signal having a steady-state component and an alternating component, and separating said alternating component from said steady-state component.

8. The method of quantitatively detecting the presence of a particular material in a mixture of matter which comprises selectively modulating all of the wavelength components of electromagnetic radiation selected from the group consisting of infra-red radiation, ultra-violet radiation and X-radiation characteristically absorbed by the material the presence of which is sought to be quantitatively detected, passing said selectively modulated beam of electromagnetic radiation through a sample of said mixture of matter to be analyzed, whereby the alternating components of said electromagnetic radiation are attenuated in proportion to the amount of said material present in said mixture, converting the electromagnetic radiation into an electrical signal having a steady-state component, representative of the unmodulated wavelengths of said beam, and an alternating component representative of the modulated wavelengths of said beam, separating said alternating component from said steady-state component, and measuring the magnitude of said alternating component.

9. The improvements of claim 3 wherein the modulating means comprises a quantity of the material the presence of which is sought to be quantitatively detected and means for cyclically varying the optical pathlength of said radiation through said material.

10. The method of quantitatively detecting the presence of a particular material in a mixture of matter which comprises directing a beam of electromagnetic radiation selected from the group consisting of infra-red radiation, ultra-violet radiation and X-radiation through a quantity of material the presence of which is sought to be quantitatively detected, cyclically varying the optical pathlength of said radiation through said quantity of material to selectively modulate the wavelength of said radiation which are characteristically absorbed by the material the presence of which is sought to be quantitatively detected, passing said selectively modulated beam of electromagnetic radiation through a sample of said mixture of matter to be analyzed whereby the modulated components of said electromagnetic radiation are attenuated in proportion to the amount of said material present in said mixture, converting the electromagnetic radiation into an electrical signal having a steady state component representative of the unmodulated wavelengths of said beam, and an alternating component representative of the modulated wavelengths of said beam, separating said alternating component from said steady state component, in measuring the magnitude of said alternating component.

References Cited in the file of this patent

UNITED STATES PATENTS

| | | |
|---|---|---|
| 1,758,088 | Schmick | May 13, 1930 |
| 2,457,695 | Liskow | Dec. 28, 1948 |
| 2,525,445 | Canada | Oct. 10, 1950 |
| 2,602,835 | Hershberger | July 8, 1952 |
| 2,648,249 | Canada | Aug. 11, 1953 |